H. HACKETT, A. SMITH AND C. SOUTHALL.
MACHINE FOR WRAPPING SWEETMEATS AND THE LIKE.
APPLICATION FILED JAN. 24, 1920.

1,392,683.

Patented Oct. 4, 1921.
7 SHEETS—SHEET 1.

Inventors
H. Hackett
A. Smith
C. Southall

By H. R. Kerslake
Attorney

H. HACKETT, A. SMITH AND C. SOUTHALL.
MACHINE FOR WRAPPING SWEETMEATS AND THE LIKE.
APPLICATION FILED JAN. 24, 1920.

1,392,683.

Patented Oct. 4, 1921.
7 SHEETS—SHEET 2.

Inventors
H. Hackett
A. Smith
C. Southall
By H. R. Kerslake
Attorney

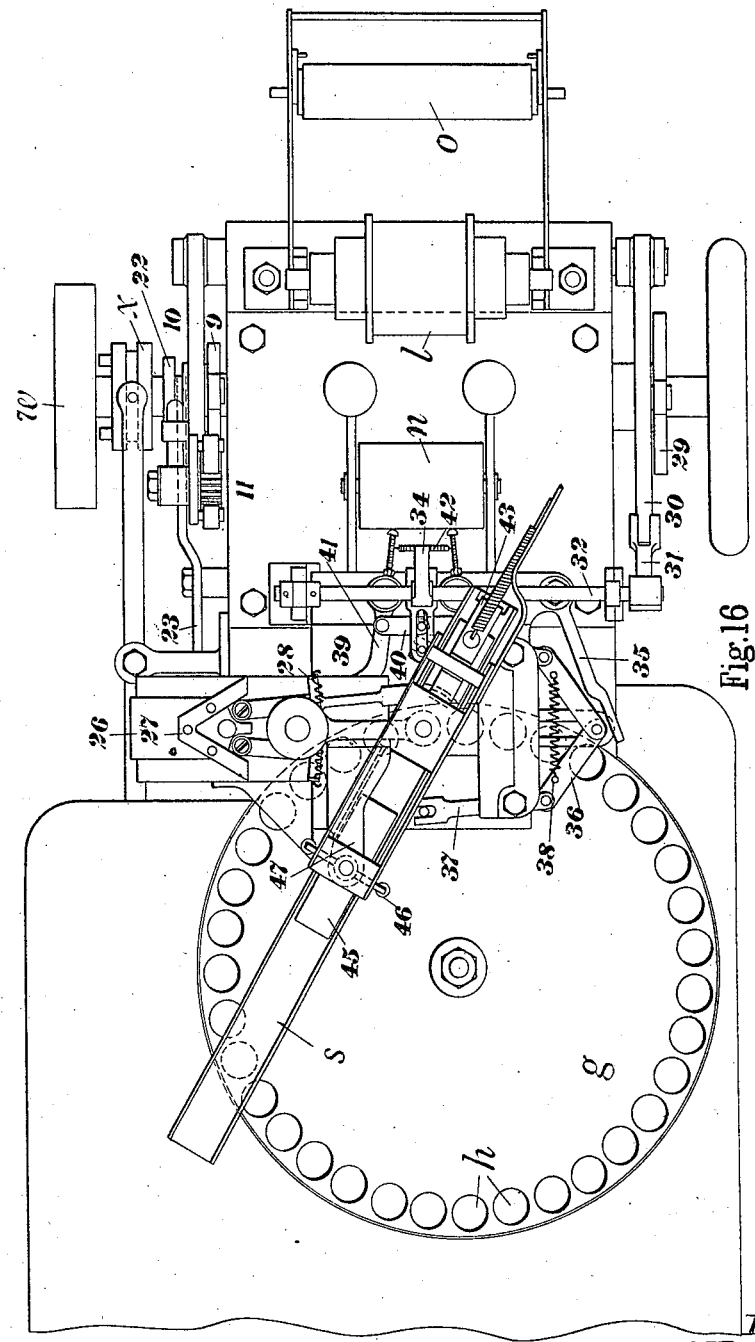

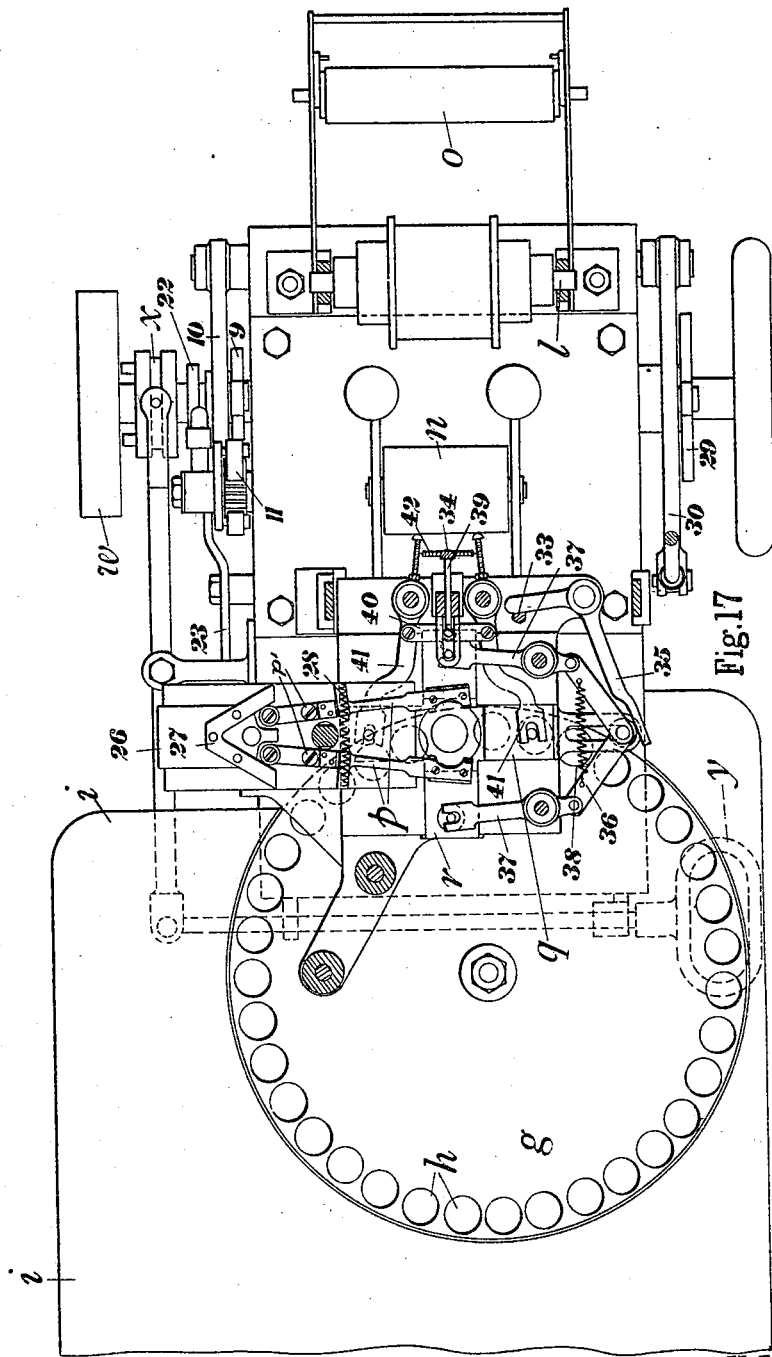

UNITED STATES PATENT OFFICE.

HENRY HACKETT, ARTHUR SMITH, AND CHRISTOPHER SOUTHALL, OF BIRMINGHAM, ENGLAND.

MACHINE FOR WRAPPING SWEETMEATS AND THE LIKE.

1,392,683.  Specification of Letters Patent.  Patented Oct. 4, 1921.

Application filed January 24, 1920. Serial No. 353,834.

(GRANTED UNDER THE PROVISIONS OF THE ACT OF MARCH 3, 1921, 41 STAT. L., 1313.)

*To all whom it may concern:*

Be it known that we, HENRY HACKETT, residing at 85 Elm road, Bournville, in the city of Birmingham, England, ARTHUR SMITH and CHRISTOPHER SOUTHALL, both residing at Villa Street Works, Hockley, in the city of Birmingham, England, subjects of the King of Great Britain and Ireland, have invented certain new and useful Improvements Relating to Machines for Wrapping Sweetmeats and the like (for which we have filed application in Great Britain March 6, 1918, Patent No. 121232,) of which the following is a specification.

This invention has for its object to construct a simple and effective machine for wrapping, more especially, irregularly shaped bodies, such as chocolates and other sweetmeats, with tin foil or like material.

Referring to the five accompanying sheets of explanatory drawings:—

Fig. 16 is a plan and Fig. 17 a sectional plan of the machine.

The same reference letters in the different views indicate the same or similar parts.

In carrying the invention into effect as shown in a chocolate wrapping machine, a rubber diaphragm $a$ formed with a suitable central aperture is fixed around its edges in a convenient holder $b$ mounted on the bed or standard of the machine. Concentrically with the aperture in the disk are mounted upper and lower vertically movable plungers $c$ and $d$. One or both of the adjacent ends of the plungers may be rubber tipped, and to limit the pressure which can be imposed on the chocolates by the plungers the upper plunger is arranged to move independently of its support $e$ against the action of a spring $f$.

Beneath the wrapping disk is arranged a revolving table $g$ which is formed near its periphery with a ring of pockets or apertures $h$ into each of which a chocolate is inserted. The table is mounted on a bench or bed $i$ and is so situated relatively to the plunger that each pocket and its contained chocolate moves in turn into a position above the lower plunger. Also beneath the aforesaid disk is provided a traveling carriage $j$ for the piece of tin foil which is severed by suitably disposed shears $k$ from a length of strip carried in the form of a coil on a spindle $l$ at one end of the machine and intermittently fed forward by suitable rolls $m$ and $n$ after passing around a tension or stretching roller $o$ which under the action of springs acting on its pivots imposes a suitable tension on the foil.

Above the rubber disk $a$ a pair of hinged lateral grippers $p$ are arranged and adjacent to these are disposed two pairs of slides $q$ and $r$ operating in directions at right angles to each other for completing the wrapping operation on the flat underside of the chocolate.

Adjacent to the finishing slides is mounted a trough $s$ into which the completed chocolates are ejected to be conveyed by gravity or otherwise to any convenient point of delivery.

Figures 1, 2, 3:
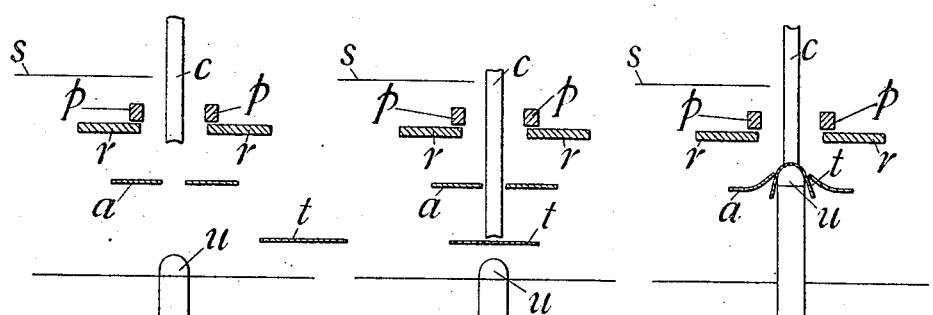
Figures 1 to 11 illustrate successive stages in the wrapping of a chocolate with tin foil by a machine constructed in accordance with this invention.

The process of wrapping chocolates in the machine briefly described above will now be described with reference to the diagrams shown in Figs. 1 to 11. At the commencement of each cycle of operations the lower plunger $d$ is in such a position that a chocolate as $u$ carried around by the table can pass on to the upper end of the plunger as shown in Fig. 1. The chocolate is here temporarily retained by the table which for a suitable interval remains at rest. A piece of foil $t$ previously fed forward is cut off and supported by the carriage $j$ and is conveyed by the carriage into position over the chocolate on the lower plunger as shown in Fig. 2. The upper plunger $c$ then descends into contact with the chocolate on the lower plunger, and with the chocolate and foil gripped between them both plungers ascend. In this stage (Fig. 3) the chocolate $u$ is carried through the extensible aperture in the rubber disk $a$ and the tin foil is drawn tightly over the top and sides of the chocolate.

Figures 4, 5, 6:
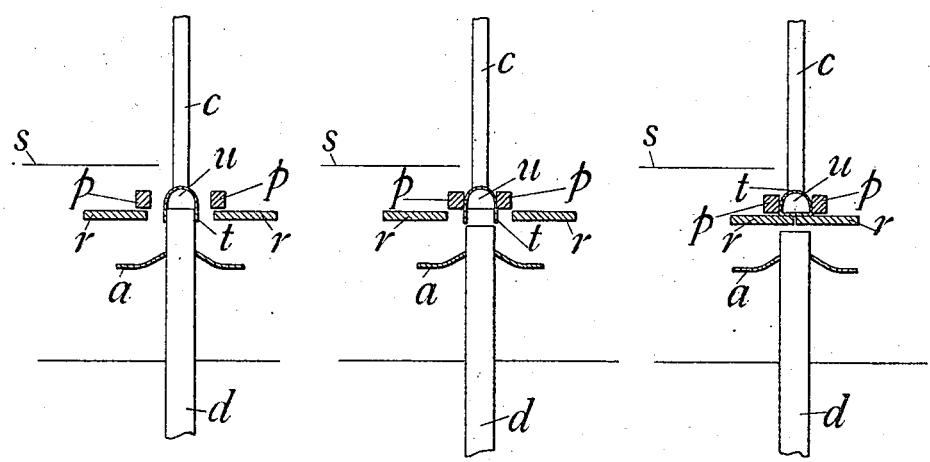
Figures 7, 8:
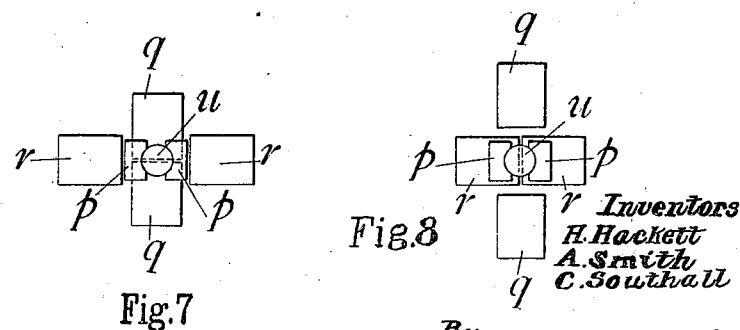
Figures 9, 10, 11:
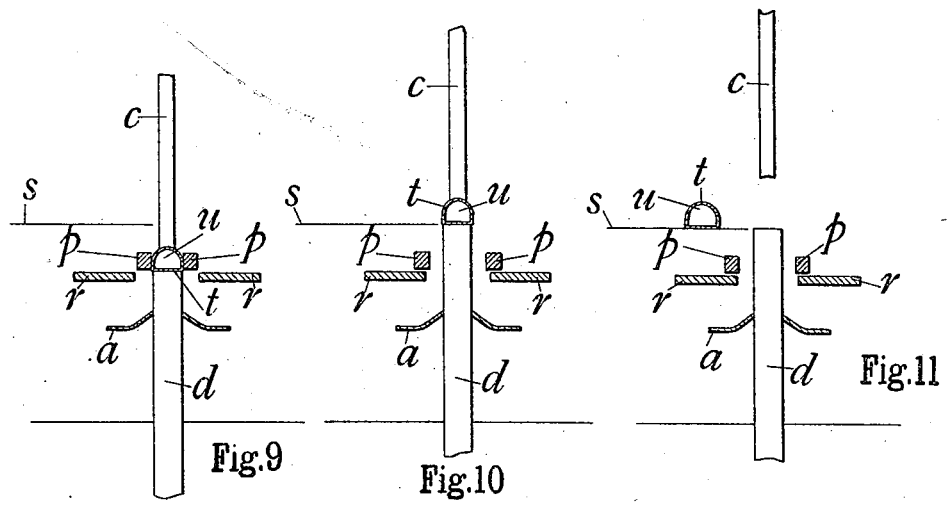
Figure 15:
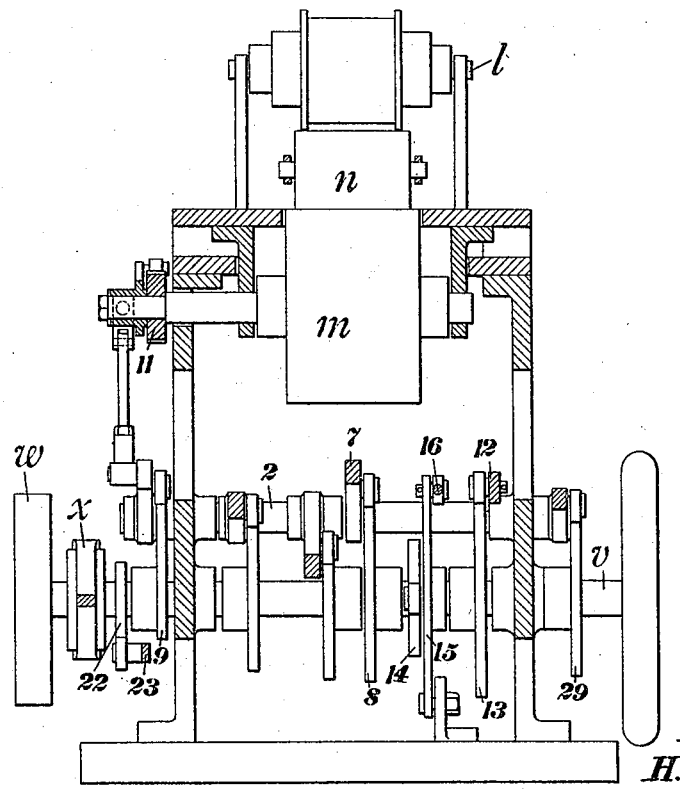
Figs. 14 and 15 are sectional end elevations.
Figure 12:
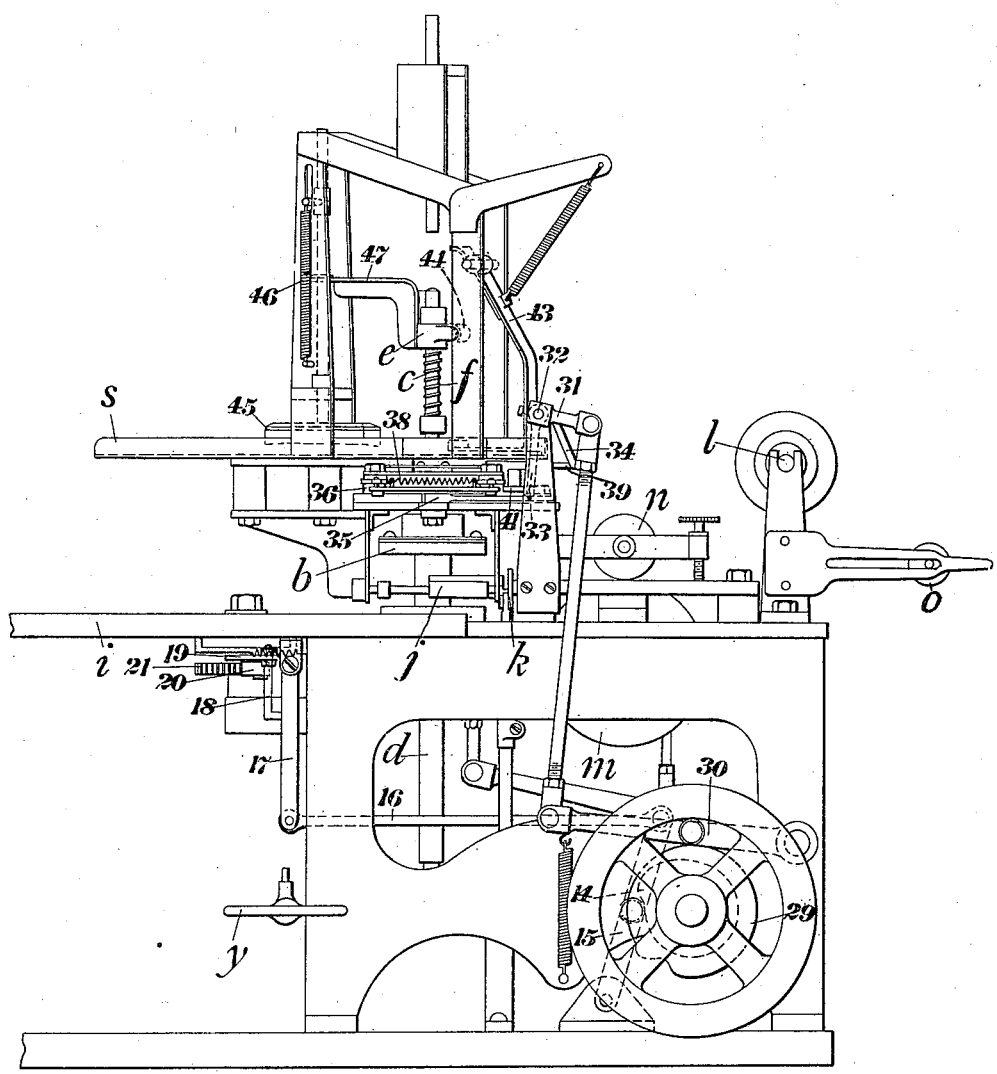
Fig. 12 is a side elevation of our machine.
Figure 13:
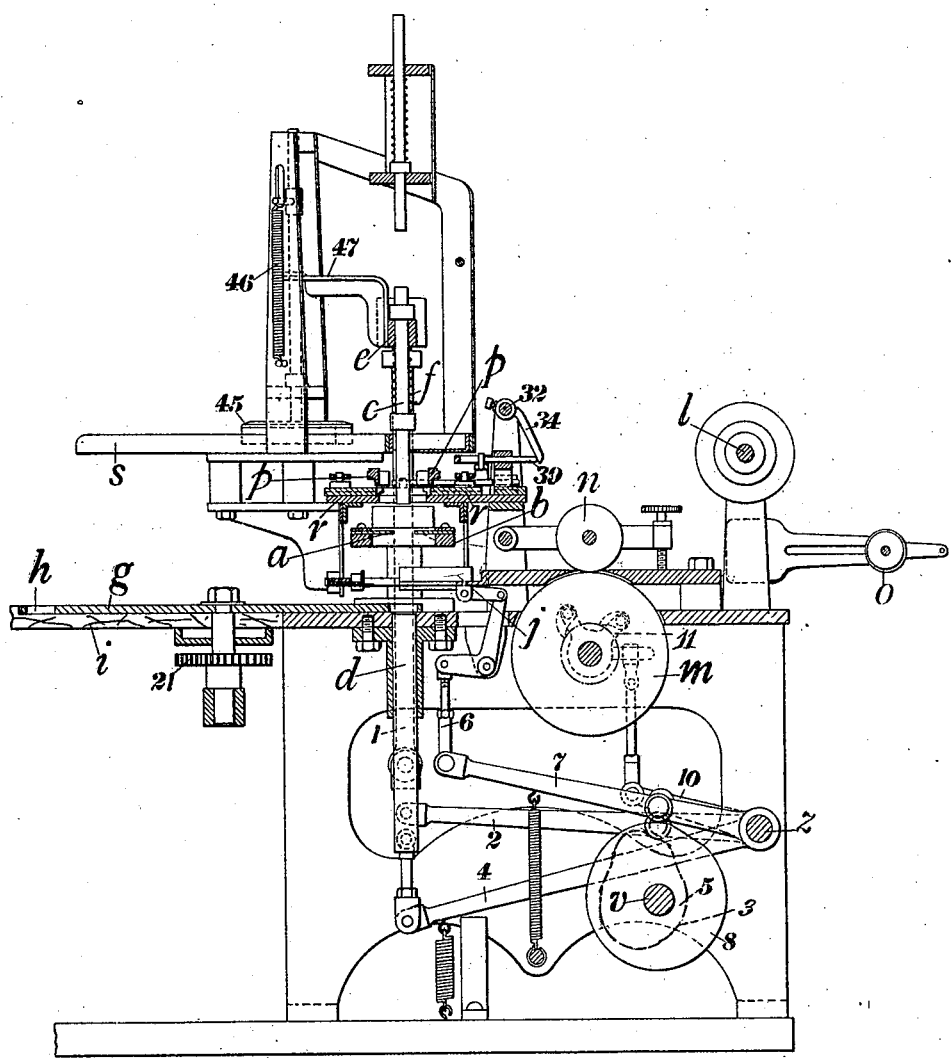
Fig. 13 is a sectional side elevation.
Figure 14:
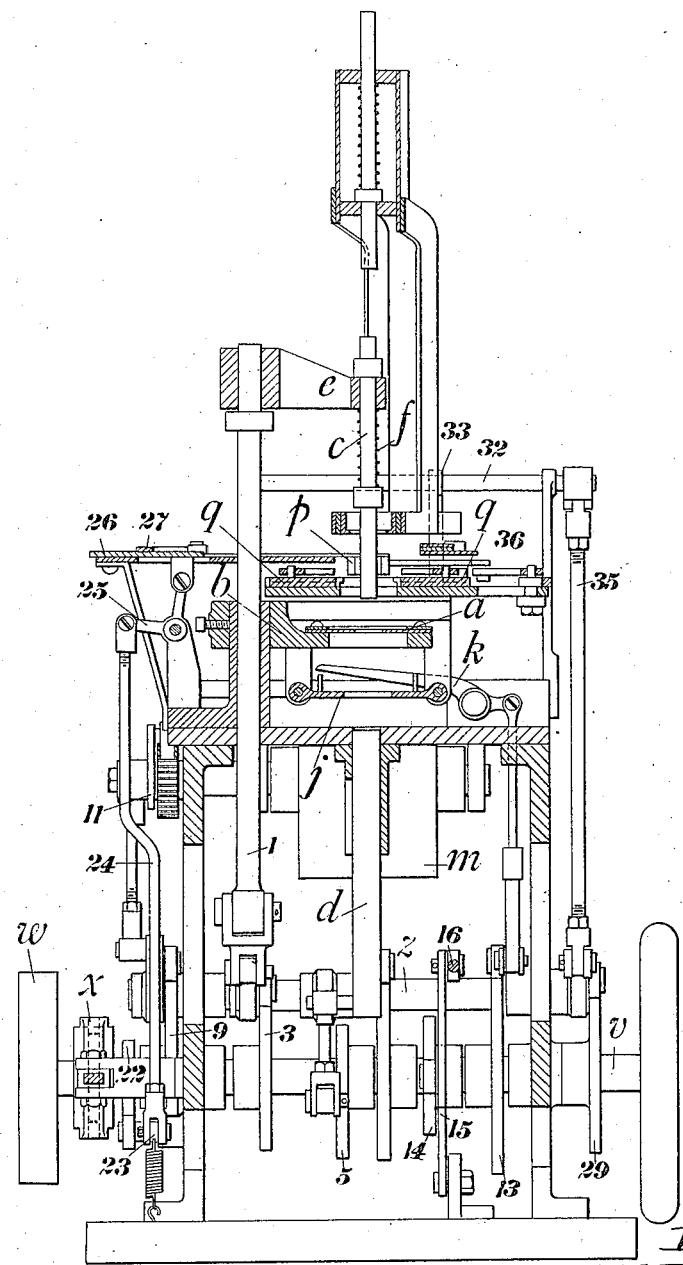

When the chocolate reaches the upper side of the disk a portion of the foil depends below the underside of the chocolate and requires to be pressed into close contact with the said side. To effect this the chocolate is carried into position between the grippers $p$ as shown in Fig. 4 and after the grippers have seized the chocolate on opposite sides, the bottom plunger $d$ is withdrawn as shown in Fig. 5. While held by the grippers one pair of slides $r$ advance upon each other and close together a portion of the foil against the flat underside of the chocolate as shown in Fig. 6, and after these slides have been withdrawn the other pair $q$ advance in directions at right angles to the first as indicated by the plan view at Fig. 7 and close down the remaining portion of the foil. A final pressure may then be given by another action of the first slides as indicated by the plan at Fig. 8. The plungers $c$ and $d$ are then again caused to grip the chocolates as shown in Fig. 9 for the purpose partly of completely flattening any tuft like projection of the foil ends which may not have been properly dealt with by the slides. While gripped by the plungers the chocolate is raised to the level of the trough $s$ as shown in Fig. 10, and on being released by the plungers the completely wrapped chocolate is ejected by any conveniently arranged push piece into the trough (as shown in Fig. 11) along which the chocolate can slide under the impulse given it by the push piece or by gravity to the required point of delivery.

Various means can be employed for actuating the different mechanical elements above described. Preferably the different motions are obtained from cams acting on appropriate levers and links. All the cams are advantageously mounted on a common shaft $v$ which is rotated by belt or other gearing in any convenient manner. In the mechanism shown the shaft $v$ has mounted thereon a pulley $w$ which can be clutched to the shaft by a clutch $x$ operated from a handle $y$. The various levers for receiving motion from the cams and transmitting same either directly or indirectly to different parts of the machine may also advantageously have a common pivot shaft $z$.

Regarding the details of the machine illustrated, the plunger $c$ is actuated by a rod 1, lever 2 and cam 3, while the plunger $d$ is actuated by a lever 4 and cam 5. Motion is transmitted to the foil carriage $j$ through levers 6 and 7 from a cam 8, and the rollers $m$ and $n$ are intermittently rotated from a cam 9 through a lever 10 and ratchet and pawl mechanism 11. Actuation of the shears $k$ is effected from a lever 12 and cam 13. Intermittent rotation is imparted to the table $g$ by a cam 14, lever 15, rod 16 and lever 17. The latter bears upon a depending projection 18 from a lever 19 carrying a pawl 20 which engages a ratchet wheel 21 secured to the table spindle. Motion of the grippers $p$ is obtained from a cam 22 acting through a lever 23 on a rod 24 which transmits motion to a bell-crank lever 25 and sliding plate 26. On the latter is secured a vee-shaped piece 27 which can abut against the adjacent ends of the grippers and cause the opposite ends of the grippers to be separated. These grippers are pivoted at $p'$ (Fig. 17). When the said piece 27 is withdrawn the grippers close on to and secure the chocolate under the action of a spring 28 (Fig. 17). The two pairs of slides $q$ and $r$ are operated from a single cam 29 acting through levers 30 and 31 on a shaft 32, which carries a pair of rocking push pieces 33 and 34. The push piece 33 acts on a bell-crank lever 35 (Fig. 17) which operates through toggle links 36 a pair of levers 37 respectively connected to the slides $r$, and thereby produces motion in the said slides in one direction. The opposite motion is produced by a spring 38. The push piece 34 acts on a sliding rod 39 which acts on the toggle links 40 and thereby operates in one direction the levers 41 attached to the slides $q$. Return motion is effected by the spring 42. Removal of the chocolate from the plungers into the delivery trough $s$ is performed by an ejector 43 comprising a lever which is acted upon at its upper end by a lateral projection 44 from the upper plunger $c$. When the latter approaches the upper limit of its movement it strikes the upper end of the ejector and by swinging the ejector causes the lower end 48 to strike the chocolate and impel it into the trough. While passing along the trough the chocolate may be subjected to the action of a soft pad or presser 45 which presses the foil wrapping into or over any pattern or design on the chocolate more completely than can be effected in the wrapping operation, thereby causing the outline of the said pattern or design to be more sharply defined in the foil. The pad is pressed into contact with the chocolate by a spring 46 and is raised by an arm 47 on the plunger $c$. From beneath the pad the chocolate passes to the point of delivery along the trough by the pressure of the chocolates behind it which are intermittently impelled forward by the ejector.

It has not been deemed necessary to illustrate fully all the cams hereinbefore referred to, as their proper peripheral configuration to produce the desired movements can readily be determined by a competent designer. Suitable springs are employed as illustrated where necessary, but all the springs have not been specifically mentioned as the functions of those not mentioned are sufficiently obvious from inspection of the drawings. Further, suitable connecting links are employed where necessary between the various levers and these also have not been specifically described where their purpose is evident from the drawings.

The invention is not limited to sweetmeats as it may be applied also to other bodies, both regular and irregular, although the invention is more especially useful for the wrapping of irregular bodies. Also the invention is not limited to any particular cycle of operations. Further the mechanical details herein described may be modified in various ways, and instead of a flexible disk any other soft and extensible body having a dilatable aperture therein may be used. In all cases, however, a pair of indpendently and conjointly movable plungers adapted to grip the chocolate and carry it through the different stages in the wrapping operation are employed.

Having thus described our invention what we claim as new and desire to secure by Letters Patent is:—

1. In machines for wrapping sweetmeats and like bodies with a thin enveloping medium, the combination comprising a sheet of flexible material having an orifice therein, upper and lower plungers between which the body and its enveloping medium are carried through the said orifice, grippers situated above the flexible material for holding the body and permitting it to be released by the plungers, slides for closing the ends of the enveloping medium against the underside of the body, and means for imparting movements to the said parts in their proper sequence, substantially as described.

2. In machines for wrapping sweetmeats and like bodies with a thin enveloping medium, the combination comprising a sheet of flexible material having an orifice therein, upper and lower plungers between which the body and its enveloping medium are carried through the said orifice, grippers situated above the flexible material for holding the body and permitting it to be released by the plungers, slides for closing the ends of the enveloping medium against the underside of the body, and means whereby after the completion of the wrapping operation the plungers are caused to seize the body and convey it to a discharge position, substantially as described.

3. In machines for wrapping sweetmeats and like bodies with a thin enveloping medium, the combination comprising a sheet of flexible material having an orifice therein, upper and lower plungers between which the body and its envelpoing medium are carried through the said orifice, grippers situated above the flexible material for holding the body and permitting it to be released by the plungers, slides for closing the ends of the enveloping medium against the underside of the body, means whereby after the completion of the wrapping operation the plungers are caused to seize the body and convey it to a discharge position, and means actuated by the plungers for ejecting the body from the plungers, substantially as described.

4. In machines for wrapping sweetmeats and the like with a thin enveloping medium, the combination comprising a sheet of flexible material having an orifice therein, a rotary feed table carrying the body beneath the said orifice, means for cutting off and feeding on to the body a piece of the enveloping medium, upper and lower plungers between which the body and its enveloping medium can be seized and carried through the said orifice, grippers situated above the flexible material for holding the body and permitting it to be released by the plungers, slides for closing the enveloping medium against the underside of the body, means for imparting movements to the said parts in their proper sequence, means whereby the plungers are caused to again seize the body and its enveloping medium after the action of the slides and convey it to a discharge position, and means actuated by the plungers for ejecting the body from the plungers, substantially as described.

In testimony whereof we have signed our names to this specification.

HENRY HACKETT.
ARTHUR SMITH.
CHRISTOPHER SOUTHALL.